UNITED STATES PATENT OFFICE.

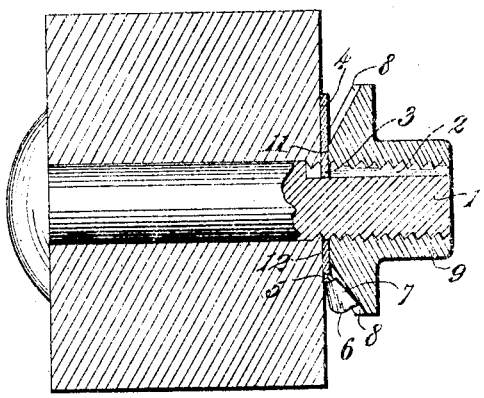
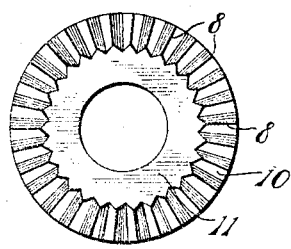
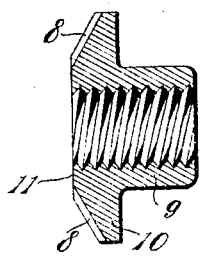
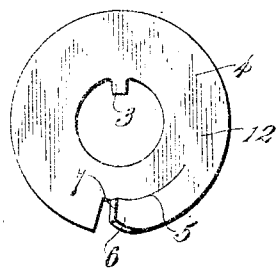
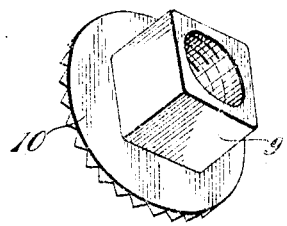

SAMUEL H. COLEMAN, OF IDABEL, OKLAHOMA, ASSIGNOR OF ONE-HALF TO DAVID W. ORR, OF IDABEL, OKLAHOMA.

NUT-LOCK.

No. 913,201.   Specification of Letters Patent.   Patented Feb. 23, 1909.

Application filed July 27, 1908. Serial No. 445,548.

*To all whom it may concern:*

Be it known that I, SAMUEL H. COLEMAN, a citizen of the United States, residing at Idabel, in the county of McCurtain and State of Oklahoma, have invented certain new and useful Improvements in Nut-Locks, of which the following is a specification, reference being had to the accompanying drawings.

This invention relates to improvements in nut-locks and consists of the details of construction hereinafter described and claimed, and illustrated in the accompanying drawings, in which:

Figure 1 is a sectional view showing the application of the improved nut lock; Fig. 2 is an end view of the nut; Fig. 3 is a longitudinal section; Fig. 4 is a detail view of the washer; and Fig. 5 is a detail view of the nut.

In the drawings 1 denotes a bolt or the like having formed in its screw threaded end a longitudinal groove 2 adapted to receive an inwardly extending radial tooth or projection 3 formed in the opening of a washer 4. The latter is in the form of a circular disk or plate of resilient sheet steel having a central opening of sufficient size to receive the bolt and having at a suitable point in one side a substantially L-shaped slit 5, one portion of which is radial to and the other portion concentric with the axis of the washer, and which forms a circumferential locking tongue or pawl 6. The latter is curved longitudinally or lengthwise and its main or body portion lies in the plane of the washer while its extremity is bent angularly beyond the plane of the outer face of the washer to provide an inwardly inclined edge tooth 7 to engage ratchet teeth 8 formed upon a nut 9. The nut 9 has a body portion of square or other polygonal shape in which is a threaded bore or opening to receive the bolt and at the inner end of which is formed an annular radially projecting flange 10. This flange is of greater diameter or width than the width of the nut and its under face has an inwardly beveled portion in which the ratchet teeth 8 are formed. Said beveled portion corresponds in width to that of the flange 10 so that upon the inner face of the nut is formed a smooth continuous or annular bearing surface 11 to contact with a similar bearing surface 12 upon the washer 4, said bearing surface 12 being formed by making the L-shaped slit 11 in the washer a suitable distance from the central opening in the latter, as clearly shown in Fig. 4. Owing to this construction, it will be seen that the washer will not be weakened by the formation of the locking tongue or pawl 6 in it, that the nut will have a smooth and continuous bearing surface upon the washer to insure an even distribution of the strain and that the ratchet teeth 8 being formed in the beveled or inclined bottom face of the flange will be entirely out of contact with the washer and will therefore not be subject to wear when the nut is turned. It will also be seen that as, with the exception of the free end of the tongue, the portions of the washer are undeflected, or are arranged in a common plane, the outer face not only forms the continuous flat bearing surface 12 for engagement by the nut, but the opposite or inner face of the washer also forms a continuous flat bearing surface to rest against the object to be clamped, this adapting the washer to be more firmly secured in position. Said ratchet teeth 8 are spaced by the beveled portion from the outer face of the washer and are substantially V-shaped in cross section, that is, the opposite faces of each tooth are disposed at acute angles to each other and to the faces of the adjacent teeth, in order that the bent end or tooth of the tongue may be free to move and may ride over the ratchet teeth so that the nut may be removed from the bolt when sufficient pressure is applied by means of a wrench or the like, to unscrew the nut. The resilient locking tongue or pawl 6 is of such shape, however, that it effectively engages the ratchet teeth and prevents the nut from working loose, no matter how much jar or vibration the device is subjected to. The ratchet teeth are made small and a great number of them are provided so that the nut will be locked at any desired adjustment.

From the foregoing it will be seen that by making the washer with the locking tongue or pawl adjacent to its edge and leaving a solid or continuous bearing surface between such pawl and the central opening in the washer, the latter will be as strong as an ordinary washer and will permit the nut to have an effective contact with it; and that by making the nut with the radial flange 10 and forming the ratchet teeth as set forth upon the beveled inner surface of said flange, that the ratchet teeth will be disposed out of contact with the washer and will therefore not be subject to wear and at the same time the continuous annular bearing surface 11 will be formed upon the nut for engagement with the annular bearing surface 12 on the washer. It will be further noted that the device is exceedingly simple in construction so that it may be produced at a small cost, that the nut can be easily applied and locked at any adjustment and as readily removed by the use of an ordinary wrench.

Having thus described the invention what is claimed is:

A nut-lock comprising, in combination, a bolt having a longitudinal groove in its threaded end, a washer embodying a resilient metal disk formed with a central opening to receive the bolt and with an inwardly extending radial tooth within said opening to enter the groove in the bolt, said washer being also formed adjacent its outer edge with an L-shaped slit forming a resilient circumferential locking tongue having its body portion lying in the plane of the washer and its free end bent at an angle beyond the plane of the outer face of the washer, the remainder of the latter being undeflected to provide flat inner and outer bearing faces, and a nut upon the bolt having a reduced rectangular outer portion and formed at the inner end thereof with an annular radially projecting flange, the inner face of which is formed with an inner annular bearing portion and an outer annular beveled portion, the latter being provided with ratchet teeth around the same for engagement by the bent end of said tongue, said ratchet teeth being spaced by the bevel from the outer face of the washer and being V-shaped in cross section, whereby the nut may be screwed either on or off of the bolt by a wrench or the like engaged with its rectangular outer end, substantially as described.

In testimony whereof I hereunto affix my signature in the presence of two witnesses.

SAMUEL H. COLEMAN.

Witnesses:
E. G. NELSON,
W. A. MORELAND.